United States Patent
Cherches et al.

(10) Patent No.: US 12,216,919 B2
(45) Date of Patent: *Feb. 4, 2025

(54) EXTERNAL MEMORY DATA INTEGRITY VALIDATION

(71) Applicant: Texas Instruments Incorporated, Dallas, TX (US)

(72) Inventors: Barak Cherches, Ramat Ha'Kovesh (IL); Uri Weinrib, Mazkeret Batya (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,547

(22) Filed: Nov. 20, 2023

(65) Prior Publication Data
US 2024/0086081 A1  Mar. 14, 2024

Related U.S. Application Data

(63) Continuation of application No. 17/527,865, filed on Nov. 16, 2021, now Pat. No. 11,861,179.

(51) Int. Cl.
  *G06F 3/06* (2006.01)
(52) U.S. Cl.
  CPC .......... *G06F 3/0619* (2013.01); *G06F 3/0655* (2013.01)

(58) Field of Classification Search
  CPC .............................. G06F 3/0619; G06F 3/0655
  See application file for complete search history.

(56) References Cited

U.S. PATENT DOCUMENTS

| | | | |
|---|---|---|---|
| 11,302,020 | B2 | 4/2022 | Matsuo |
| 2011/0022825 | A1 | 1/2011 | Spackman |
| 2019/0370114 | A1 | 12/2019 | Troia |
| 2020/0202004 | A1 | 6/2020 | Montero |
| 2022/0083640 | A1 | 3/2022 | Duval |
| 2022/0284105 | A1 | 9/2022 | Krishnegowda |

OTHER PUBLICATIONS

Elbaz, Reouven et al., "TEC-Tree: A Low-Cost, Parallelizable Tree for Efficient Defense against Memory Replay Attacks," Cryptographic Hardware and Embedded Systems—CHES, Sep. 10-13, 2007, pp. 289-302, Vienna, Austria, found at: https://www.iacr.org/archive/ches2007/47270289/47270289.pdf.

*Primary Examiner* — Jason W Blust
(74) *Attorney, Agent, or Firm* — Mandy Barsilai Fernandez; Frank D. Cimino

(57) ABSTRACT

In some examples, a method includes determining, during a boot sequence of a controller, a hash value for data of a block of a flash storage device, the block including executable code, determining a bit pattern based on a randomly generated number, extracting a subset of data bits of the hash value according to the bit pattern to obtain a snippet, and storing the snippet to a secure storage device.

30 Claims, 2 Drawing Sheets

EXTERNAL MEMORY DATA INTEGRITY VALIDATION

CROSS-REFERENCE TO RELATED APPLICATION

This application is a continuation of U.S. patent application Ser. No. 17/527,865, filed Nov. 16, 2021, which application is hereby incorporated herein by reference.

BACKGROUND

Some components transfer code from flash storage to a local cache prior to execution. Other components execute the code in place from the flash storage, where the flash storage is an external device (e.g., off-device) from a perspective of the device executing the code. Such execution may be referred to as execute in place (XIP).

SUMMARY

In some examples, a device includes a controller and a data integrity engine. The controller is configured to receive executable code from an off-device flash storage. The data integrity engine is coupled to the controller and the flash storage. The data integrity engine is configured to determine, during a boot sequence of the controller, a first hash value for a block of the flash storage, the block of the flash storage including the executable code, extract a subset of data bits of the first hash value to obtain a snippet, store the snippet in a local memory of the data integrity engine, and determine, at run-time of the controller, data integrity of the executable code. The data integrity of the executable code is determined by determining a second hash value of the executable code, comparing a subset of data bits of the second hash value to the snippet to determine a comparison result, and validating the integrity of the executable code responsive to the comparison result indicating a match of the subset of data bits of the second hash value to the snippet.

In some examples, a method includes determining, during a boot sequence of a controller, a hash value for data of a block of a flash storage device, the block including executable code, determining a bit pattern based on a randomly generated number, extracting a subset of data bits of the hash value according to the bit pattern to obtain a snippet, and storing the snippet to a secure storage device.

In some examples, a method includes receiving, at run-time of a controller, data of a block of a flash storage device, the block including executable code, determining a hash value for the data of the block, reading data of a snippet from a secure storage device, comparing a portion of the hash value to the data of the snippet, determining a data integrity validation result of pass responsive to the portion of the hash value matching the data of the snippet, and determining a data integrity validation result of fail responsive to the portion of the hash value not matching the data of the snippet.

BRIEF DESCRIPTION OF THE DRAWINGS

For a detailed description of various examples, reference will now be made to the accompanying drawings.

DETAILED DESCRIPTION

Figure 1:
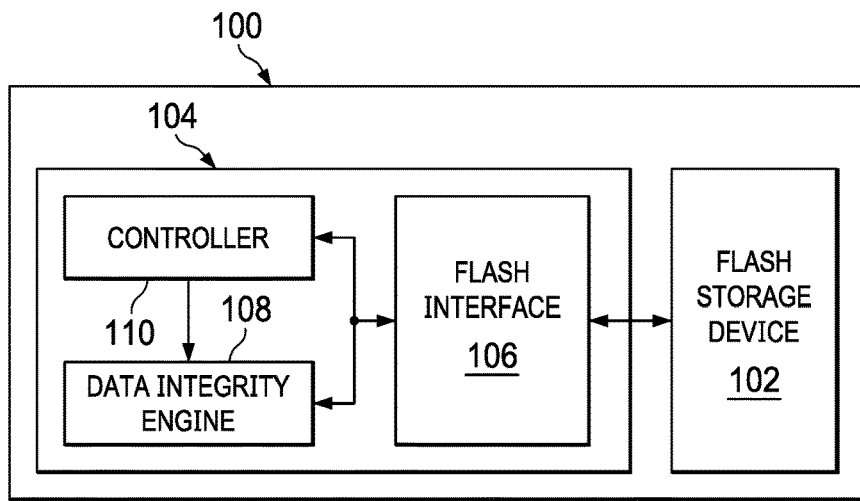
FIG. 1 is a block diagram of an electronic device, in accordance with various examples.

XIP, as described above, can introduce security challenges. In some cases, the components are controllers. In other cases, the components are any suitable components that access and/or execute data or executable code from flash storage. XIP code of the flash storage may be verified during a boot operation of the controller, but not at a time of reading the code (e.g., run-time) from the flash storage for execution by the controller. For example, some approaches for verifying the XIP code of the flash storage at run-time, such as approaches that verify an entirety of the XIP code or the flash storage, may degrade performance of the controller an amount sufficient to render the controller unsuitable for certain application environments. This may create a run-time attack vector in which, after the validation of the code during the boot operation, a malicious actor could modify the code that is to be executed by the controller or inject malicious code into a data stream provided from the flash storage to the controller. Some approaches exist for mitigating these attacks, such as validation of the code at run-time. However, such approaches can be disadvantageous in that they require comparatively large amounts of time, storage capacity (and therefore physical device space cost associated with such physical space), and increase latency in operation of the controller.

Aspects of this description provide for validating integrity of code snippets during the boot operation of the controller. For example, for each block of data on the flash storage, a digest may be formed that is an output of a hash function. A block of data, as used herein, is a unit of data of the flash storage having a programmed size. A bit pattern, based on a randomly generated number, may be determined for each region of the flash storage and a portion of the digest may be preserved as the snippet according to that bit pattern. A region of the flash storage, as used herein is an addressable portion of the flash storage that is defined by a start offset and an end offset, and may vary in size and/or location, from one implementation to another, in the flash storage. Data, and a block of data as described above, may belong to only one region of the flash storage such that regions do not overlap or conflict. In some examples, the randomly generated number, and therefore the bit pattern, may be changed responsive to a device or system reset. The preserved bits of the digest may be stored as the snippet for a respective block of data of the flash storage. The bit pattern may vary in length from one digest to another. In this way, a greater level of security may be applied to some blocks of data of the flash storage than to other blocks of data. At run time, a hash of a block of data being provided to the controller for execution may be determined and data bits of that hash, as determined by the bit pattern, compared to the stored snippet for the respective block of data on the flash storage. Responsive to a determination that the data is a match, execution of the data may proceed. Responsive to a determination that the data is not a match, execution of the data may be halted. In other examples, the flash storage may receive and/or provide a bus fault responsive to a determination that the data is not a match.

FIG. 1 is a block diagram of an electronic device 100, in accordance with various examples. In at least some examples, the electronic device 100 includes flash storage device 102 and a circuit 104. The electronic device 100 may be generally representative of any suitable device that includes des flash storage device 102 and the circuit 104, such as a computer, a notebook, a smartphone, a sensor, a wearable device, a tablet device, an Internet of Things device, or the like. The flash storage device 102 is off-device storage from a perspective of the circuit 104 (e.g., the flash storage device 102 and the circuit 104 are not in a same electrical component package). The circuit 104 may be a system on a chip (SoC) or other circuit that includes a combination of components. For example, the circuit 104 may include a flash interface 106, a data integrity engine 108, and a controller 110. Although not shown in FIG. 1, in some examples, the circuit 104 also includes a cache, such as for temporary storage of data for, or by, the controller 110. The circuit 104 may also include additional circuitry (not shown) such as an on-the-fly decryption circuit that decrypts encrypted data received from the flash storage device 102 via the flash interface 106 for use by the data integrity engine 108 and/or the controller 110. The flash interface 106 is any suitable interface that enables the data integrity engine 108 and/or the controller 110 to interact with, communicate with, and/or read data from the flash storage device 102. In some examples, the flash interface 106 is implemented according to a serial peripheral interface (SPI), such as quad-SPI or octal-SPI, methodology. The data integrity engine 108 is configured to determine data integrity of data provided by the flash storage device 102 to the controller 110. Data integrity, as used herein, may indicate fidelity of the data across a period of time, such as indicating at a second time at which the data (or a portion of the data) is analyzed whether the data remains intact (e.g., unchanged) since a first time that the data (or a portion of the data) was analyzed.

For each block of the flash storage device 102, the data integrity engine 108 may determine a snippet. As used herein, a snippet is an extract of data. For example, a snippet determined by the data integrity engine 108 for a block of the flash storage device 102 may include an extract or portion of data of the digest (e.g., hash result) of that block of the flash storage device 102. In some examples, the snippet is extracted from the block according to a determined bit pattern. The snippet may be in plain text, encrypted, hashed, or in any other suitable format. An amount of data of the block that is included in the snippet (e.g., such as a length or size of the determined bit pattern) may be programmable. In this way, a first snippet for a first block of the flash storage device 102 and belonging to a first region may have a different size than a second snippet of a second block of the flash storage device 102 belonging to a second region. A snippet of larger size, or greater length, than another snippet may have a greater level of security (or higher level of confidence in determined integrity) than the other snippet. In some examples, the data integrity engine 108 determines a snippet for each block of the flash storage device 102, or each block of the flash storage device 102 that includes data, during a boot or startup sequence of the electronic device 100, circuit 104, and/or controller 110. The data integrity engine 108 may store each snippet locally, such as in a storage circuit (not shown) of the data integrity engine 108.

Responsive to the controller 110 accessing data from the flash storage device 102, the data integrity engine 108 may validate integrity of the data. For example, the data integrity engine 108 may obtain a test snippet corresponding to a block of the flash storage device 102 in which the data is stored. In some examples, the test snippet is formed in a manner substantially the same as the snippet described above. Responsive to a determination that the data is a match, the controller 110 may receive the data and/or execute the data, such as if the data is executable code. Responsive to a determination that the data is not a match, the data integrity engine 108 may prevent the controller 110 from receiving the data and/or executing the data, or may provide an indication of a validation failure to the controller 110 to enable the controller 110 to make, or solicit the providing of, a determination for how to proceed with respect to the data.

The controller 110 may be any suitable controller, microcontroller, processor, or logic that receives, manipulates, processes, executes, or otherwise interacts with data or executable code. In at least some examples, the controller 110 provides control information to the data integrity engine 108. For example, the controller 110 may provide control information to the data integrity engine 108 including the randomly generated number, a number of bits for the bit pattern, etc. In some examples, the controller 110 provides a signal to the data integrity engine 108 that causes the data integrity engine 108 to reset, changing the bit pattern and/or the number of bits for the bit pattern.

In at least some examples, the data integrity engine 108 determining whether the snippet stored by the data integrity engine 108 matches data from a read block of the flash storage device 102 provides for determining integrity and/or validation of the data. The determination of integrity or validation of the data may indicate whether the data remains intact (e.g., unchanged) since the boot or startup sequence, or reset, of the electronic device 100, circuit 104, data integrity engine 108, and/or controller 110. In some examples, the determination is not absolute. For example, in implementations in which a snippet contains fewer than all bits of data of a block of the flash storage device 102, the determination may be with respect to the data bits included in the snippet, with those data bits functioning as a proxy for all data bits of the block for the purpose of determining integrity and/or validation of the data. Generally, a level of confidence in the determined integrity of data of a block of the flash storage device 102 may be related to a size of the snippet, where a larger snippet corresponds to a higher level of confidence in integrity of the data on which the snippet is based. By basing the determination on snippets of the data of blocks of the flash storage device 102, storage overhead of the data integrity engine 108 and latency in the controller 110 acting on data from the flash storage device 102 may be reduced in comparison to basing the determination on the full data of the blocks of the flash storage device 102.

In some examples, the bit pattern, and therefore the snippets, may be refreshed. For example, the controller 110 may reset the data integrity engine 108, or the electronic device 100, circuit 104, data integrity engine 108, and/or controller 110 may be reset. Responsive to the reset, the controller 110 may provide another random number to the data integrity engine 108 and the data integrity engine 108 may determine a new bit pattern based on the another random number. The data integrity engine 108 may determine new snippets for each block of the flash storage device 102 based on the new bit pattern, without the electronic device 100, circuit 104, and/or controller 110 performing the secure boot sequence, described above. In this way, data security and integrity validation provided by the data integrity engine 108 by periodically refreshing the snippets to be determined according to a new bit pattern based on a new random number.

Figure 2:
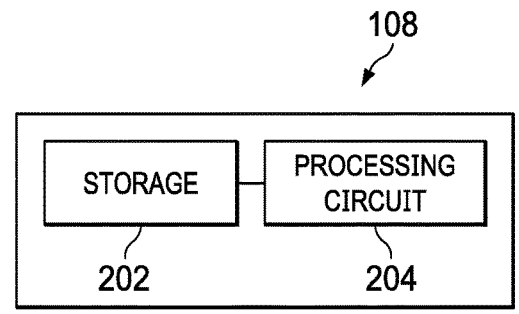
FIG. 2 is a block diagram of a data integrity engine, in accordance with various examples.

FIG. 2 is a block diagram of the data integrity engine 108, in accordance with various examples. In at least some examples, the data integrity engine 108 includes storage 202 and a processing circuit 204. The storage 202 may be referred to as a local memory for the processing circuit 204, for example, such that the storage 202 and the processing circuit 204 may be implemented in a same electrical component package, in a same integrated circuit (IC), on a same semiconductor die, etc. In at least some examples, the storage 202 is a random-access memory (RAM). The processing circuit 204 may be any component suitable for performing data processing according to instructions stored in the storage 202 or programmed to the processing circuit 204, such as a processor, field programmable gate array (FPGA), controller, microcontroller, logic circuit, application-specific integrated circuit (ASIC), etc.

In operation, the data integrity engine 108 determines snippets of data of blocks of the flash storage device 102 of FIG. 1 and validates the integrity of data read from the flash storage device 102 by the controller 110 based on those determined snippets. For example, during a boot or startup sequence of the electronic device 100, circuit 104, and/or controller 110, the data integrity engine 108 may determine a digest for each block of the flash storage device 102. A digest, as used herein, may be a value determined based on the data of a block of the flash storage device 102 and a unique identifier of the flash storage device 102. In some examples, the unique identifier is a key or signature of the flash storage device 102, such as a public key of the flash storage device 102. In some implementations, the digest for a block of the flash storage device 102 is determined by keyed-hashing of the data of the block. For example, the data integrity engine 108 may perform keyed-hash message authentication code (HMAC) hashing in which the data integrity engine 108 determines a hash value (e.g., the digest) for a block of the flash storage device 102 based on the data of the block and the unique identifier of the flash storage device 102. In some examples, the hashing is performed according to HMAC Secure Hash Algorithm (SHA) 256 encrypted hashing. In some examples, the hash value is determined by the processing circuit 204. In other examples, the hash value is determined by a dedicated circuit (not shown) such as an accelerator (e.g., such as a hash accelerator specifically programmed to perform a specific type of hashing). By determining the hash value according to both the data of the block of the flash storage device 102 and the unique identifier of the flash storage device 102, the data integrity engine 108 validating the integrity of data read from the flash storage device 102 both authenticates the data as being unchanged since the boot or startup sequence and provides attestation that at run-time the flash storage device 102 is a genuine and/or authenticated device.

The data integrity engine 108 determines a bit pattern based on a random number. In some examples, the random number is received from the controller 110. In other examples, the random number is provided by a random number generator (not shown), such as a pseudorandom binary sequence (PRBS) circuit or other circuit suitable of hardware-based generation and providing of a random number. In yet other examples, the random number is provided through executable code or instructions, such as executed by the processing circuit 204. In at least some examples, the random number may be changed each time the electronic device 100 is power cycled, such as each time the boot or startup sequence of the electronic device 100, circuit 104, and/or controller 110 is executed. Based on the random number, the data integrity engine 108 determines a bit pattern. For example, the bit pattern may be a sequence of data bits where a portion of the data bits have a value of logical 1 and a portion of the data bits have a value of logical 0. Bits of the digest are preserved according to the bit pattern (or alternatively, bits of the digest are discarded according to the bit pattern). For example, the processing circuit 204 processes the digest to preserve bits of the digest having a position corresponding to a bit of the bit pattern that has a value of logical 1. In other examples, the processing circuit 204 processes the digest to discard bits of the digest having a position corresponding to a bit of the bit pattern that has a value of logical 0. In some examples, the same random number, and therefore same bit pattern, is used for each block of the flash storage device 102. In other examples, different random numbers are used for at least some of the blocks of the flash storage device 102. Each snippet may be stored in the storage 202 for subsequent recall by the data integrity engine 108 for validating the integrity of data read from the flash storage device 102.

At run-time of the controller 110, the data integrity engine 108 determines a digest, as described above, for a block of the flash storage device 102 that includes data requested by the controller 110 and that is to be provided to the controller 110. Subsequent to determining the digest, the data integrity engine 108 obtains a previously stored snippet corresponding to the block of the flash storage device 102 from the storage 202 and compares the snippet to a portion of the newly determined digest. Responsive to determining that the snippet matches the portion of the newly determined digest, the data integrity engine 108 determines that the block of the flash storage device 102 is validated (e.g., the block passes the integrity validation of the data integrity engine 108). Responsive to determining that the snippet does not match the portion of the newly determined digest, the data integrity engine 108 determines that the block of the flash storage device 102 is not validated (e.g., the block fails the integrity validation of the data integrity engine 108).

Figure 3:
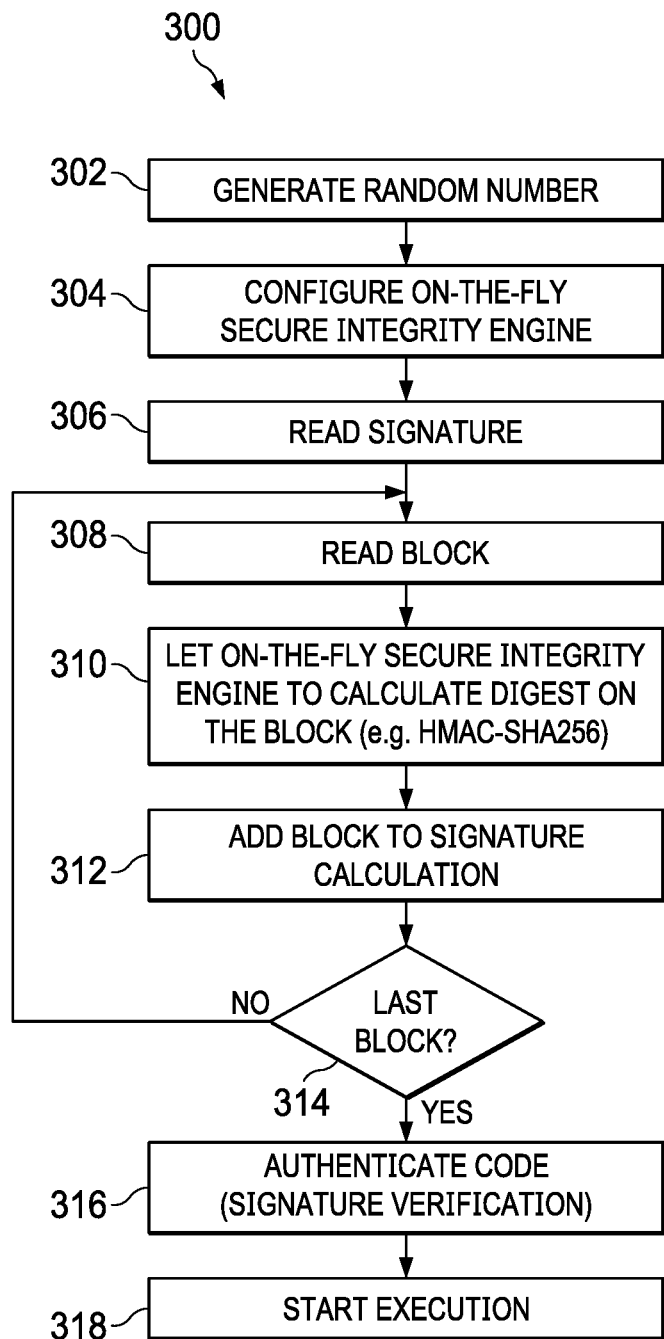
FIG. 3 is a flowchart of a method, in accordance with various examples.

FIG. 3 is a block diagram of a method 300, in accordance with various examples. In at least some examples, the method 300 is implemented in a device, such as the electronic device 100 of FIG. 1, or system. Accordingly, reference may be made to at least some components of FIG. 1 in describing the method 300. For example, the method 300 may be implemented by various components of the circuit 104, including at least the data integrity engine 108. In at least some examples, the method 300 is a boot sequence, such as a secure boot sequence, or method for the electronic device 100, circuit 104, and/or controller 110.

At operation 302, a random number is generated. In some examples, the random number is generated by the data integrity engine 108, as described above. In other examples, the random number is generated by the controller 110 and provided to the data integrity engine 108.

At operation 304, the data integrity engine 108 is configured. For example, the controller 110 provides information to the data integrity engine 108 to specify the regions and the number of bits per region for the snippets.

At operation 306, the controller 110 reads a signature of the flash storage device 102. In at least some examples, the signature is the unique identifier of the flash storage device 102, such as a public authentication key or a private authentication key of the flash storage device 102.

At operation 308, the controller 110 reads a block of the flash storage device 102. The block of the flash storage device 102 may be read, in some examples, via the flash interface 106 or by any other suitable process. In at least some examples, the data integrity engine 108 hangs off a data line or bus between the flash storage device 102 and the controller 110 such that the data integrity engine 108 also receives the block.

At operation 310, the data integrity engine 108 determines and stores a snippet for the block. In at least some examples, the snippet may be determined and stored as described above with respect to FIG. 2. For example, the data integrity engine 108 may determine a digest for the block and preserve (or discard) bits of the digest according to a bit pattern to determine the snippet, the details of which are not repeated here with respect to FIG. 3.

At operation 312, the block is added to a signature calculation. In at least some examples, the block may be read from the flash storage device 102 a single time for both determination of the snippet by the data integrity engine 108 and addition to the signature calculation. The signature calculation may be determined according to any suitable process, the scope of which is not limited herein.

At operation 314, a determination is made as to whether the block is a last block of the flash storage device 102. Responsive to the block not being the last block of the flash storage device 102, the method 300 returns to operation 308 and reads a next block of the flash storage device 102. Responsive to the block being the last block of the flash storage device 102, the method 300 proceeds to operation 316.

At operation 316, the signature is verified. The signature may be verified by the data integrity engine 108 according to any suitable process, the scope of which is not limited herein.

At operation 318, the secure boot sequence ends and the circuit 104 transitions into normal operation. In normal operation, the controller 110 may request data from the flash storage device 102 and integrity of the data may be verified by the data integrity engine 108 according to the determined snippets prior to execution or manipulation of the data by the controller 110.

While the operations of the method 300 described herein have been described and labeled with numerical reference, in various examples, the method 300 includes additional operations that are not recited herein. In some examples, any one or more of the operations recited herein include one or more sub-operations. In some examples, any one or more of the operations recited herein is omitted. In some examples, any one or more of the operations recited herein is performed in an order other than that presented herein (e.g., in a reverse order, substantially simultaneously, overlapping, etc.). Each of these alternatives falls within the scope of the present description.

Figure 4:
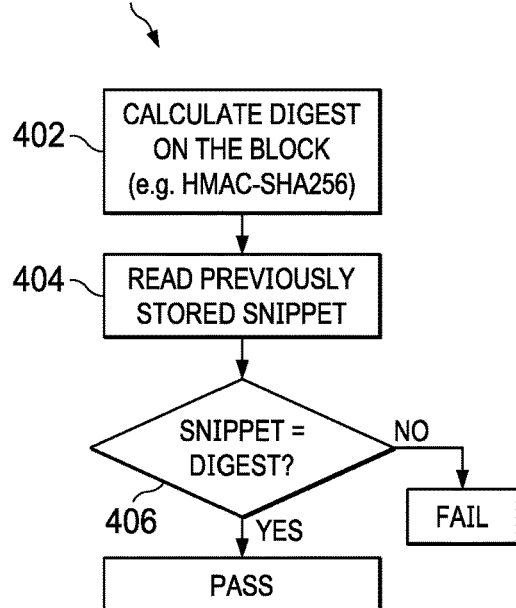
FIG. 4 is a flowchart of a method, in accordance with various examples.

FIG. 4 is a block diagram of a method 400, in accordance with various examples. In at least some examples, the method 400 is implemented in a device, such as the electronic device 100 of FIG. 1, or system. Accordingly, reference may be made to at least some components of FIG. 1 in describing the method 400. For example, the method 400 may be implemented by various components of the circuit 104, including at least the data integrity engine 108. In at least some examples, the method 400 is a method for verifying integrity of data read from the flash storage device 102 subsequent to completion of a secure boot sequence of the electronic device 100.

At operation 402, a digest of a received block of data is determined. In at least some examples, the block of data is received from the flash storage device 102. The block of data may be received responsive to the controller 110 requesting the block of data, or data included in the block of data, from the flash storage device 102. The data integrity engine 108 may determine the digest for the block as described above with respect to FIG. 2, the details of which are not repeated here with respect to FIG. 4. For example, the data integrity engine 108 may determine the digest by hashing the block according to a crypto-hashing function, such as HMAC-SHA256, based on the block and a unique identifier of the flash storage device 102.

At operation 404, the data integrity engine 108 reads a previously stored snippet. The snippet may be read, for example, from a storage circuit of the data integrity engine 108, such as the storage 202, described above with respect to FIG. 2.

At operation 406, the data integrity engine 108 compares the read snippet to the determined digest to determine whether the compared values are the same. Responsive to determining that the snippet matches the digest, the data integrity engine 108 determines that the block of the flash storage device 102 is validated (e.g., the block passes the integrity validation of the data integrity engine 108). Responsive to determining that the snippet does not match the digest, the data integrity engine 108 determines that the block of the flash storage device 102 is not validated (e.g., the block fails the integrity validation of the data integrity engine 108).

While the operations of the method 400 described herein have been described and labeled with numerical reference, in various examples, the method 400 includes additional operations that are not recited herein. In some examples, any one or more of the operations recited herein include one or more sub-operations. In some examples, any one or more of the operations recited herein is omitted. In some examples, any one or more of the operations recited herein is performed in an order other than that presented herein (e.g., in a reverse order, substantially simultaneously, overlapping, etc.). Each of these alternatives falls within the scope of the present description.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Unless otherwise stated, "about," "approximately," or "substantially" preceding a value means +/−10 percent of the stated value. Modifications are possible in the described examples, and other examples are possible within the scope of the claims.

What is claimed is:

1. A device comprising:
   a first storage; and
   a processing circuit configured to:
   determine, during a boot or startup sequence of a controller, a first authentication value for a first block of a second storage, the first block of the second storage including executable code;
   store a first snippet in the first storage, the first snippet being based on the first authentication value;
   determine, at run-time of the controller, data integrity of the first block, wherein determining the data integrity of the first block comprises:
   determining a second authentication value of the first block, and
   comparing a second snippet with the first snippet to generate a comparison result, the second snippet being based on the second authentication value,
   responsive to the comparison result indicating the first and second snippets do not match, halt or prevent the executable code from running in the controller, or prevent the controller from receiving the executable code, or provide a fault signal; and
   responsive to the comparison result indicating the first and second snippets match, allow the controller to execute the executable code.

2. The device of claim 1, wherein the processing circuit is configured to generate the first snippet by selecting a portion of the first authentication value based on a first bit pattern.

3. The device of claim 2, wherein the first bit pattern is based on a pseudorandom number.

4. The device of claim 2, wherein selecting the portion of the first authentication value comprises preserving bits of the first authentication value corresponding to asserted bits of the first bit pattern.

5. The device of claim 2, wherein the processing circuit is configured to generate the second snippet by selection a portion of the second authentication value based on the first bit pattern.

6. The device of claim 2, wherein the processing circuit is configured to, responsive to a reset of the processing circuit, refresh the first snippet based on the first authentication value and a second bit pattern.

7. The device of claim 6, wherein the second bit pattern has a length that is different from a length of the first bit pattern.

8. The device of claim 2, wherein a length of the first bit pattern is programable.

9. The device of claim 2, wherein the processing circuit is configured to generate a third snippet by selecting a portion of a third authentication value for a second block of the second storage based on a second bit pattern, the second bit pattern having a length that is different from a length of the first bit pattern.

10. The device of claim 9, wherein the processing circuit is configured to store the third snippet in the first storage.

11. The device of claim 1, wherein the processing circuit is configured to generate the first authentication value using a hash function.

12. The device of claim 1, wherein the processing circuit is configured to, responsive to a reset of the processing circuit, refresh the first snippet to a different value.

13. The device of claim 12, wherein the processing circuit is configured to refresh the first snippet without the controller performing a boot sequence.

14. The device of claim 1, wherein the processing circuit is configured to, responsive to the comparison result indicating the first and second snippets do not match, halt the executable code from running in the controller.

15. The device of claim 1, wherein the processing circuit is configured to, responsive to the comparison result indicating the first and second snippets do not match, prevent the executable code from running in the controller.

16. The device of claim 1, wherein the processing circuit is configured to, responsive to the comparison result indicating the first and second snippets do not match, prevent the controller from receiving the executable code.

17. The device of claim 1, wherein the processing circuit is configured to, responsive to the comparison result indicating the first and second snippets do not match, provide the fault signal.

18. The device of claim 1, wherein the first snippet comprises fewer than all bits of the first block.

19. The device of claim 1, wherein the first snippet is encrypted.

20. The device of claim 1, wherein the first storage and the processing circuit are integrated in an integrated circuit.

21. The device of claim 1, wherein the first authentication value is a first hash value, and wherein the second authentication value is a second hash value.

22. The device of claim 1, wherein the first storage is a random-access memory (RAM).

23. The device of claim 1, wherein the device comprises the controller, and wherein the second storage is external to the controller.

24. The device of claim 23, wherein the second storage is in a package that is separate from a package of the controller.

25. The device of claim 1, wherein the second storage is a flash memory.

26. The device of claim 1, wherein the first authentication value is based on a pseudorandom number.

27. The device of claim 26, wherein the processing circuit is configured to receive a first pseudorandom number from the controller, wherein the first authentication value is based on the first pseudorandom number.

28. The device of claim 26, wherein the processing circuit is configured to generate the pseudorandom number.

29. The device of claim 1, wherein the processing circuit is configured to determine the first authentication value based on a unique identifier of the second storage.

30. The device of claim 1, wherein the processing circuit is configured to generate the second snippet in response to a data request from the controller.

* * * * *